United States Patent [19]

Scharrer et al.

[11] 4,172,070

[45] Oct. 23, 1979

[54] OXYGEN-STABLE ROSIN-PRIMARY POLYHYDRIC ALIPHATIC ALCOHOL ESTERS AND A METHOD FOR PREPARING THE SAME UTILIZING ARYLSULFONIC ACID CATALYSIS

[75] Inventors: Roland P. F. Scharrer, Pelham, N.Y.; Martin Epstein, Norwalk, Conn.

[73] Assignee: Arizona Chemical Company, Wayne, N.J.

[21] Appl. No.: 899,041

[22] Filed: Apr. 24, 1978

Related U.S. Application Data

[63] Continuation-in-part of Ser. No. 890,450, Mar. 27, 1978, abandoned.

[51] Int. Cl.$^2$ .............................................. C09F 1/04
[52] U.S. Cl. ..................................... 260/104; 260/103; C09F/1/04
[58] Field of Search ......................................... 260/104

[56] References Cited

U.S. PATENT DOCUMENTS

| | | | |
|---|---|---|---|
| 1,840,395 | 1/1932 | Johnston | 260/104 |
| 1,923,507 | 8/1933 | Rosenblum | 260/104 |
| 2,138,193 | 11/1938 | Peterson | 260/104 |
| 2,590,910 | 4/1952 | Wittcoff et al. | 260/104 |
| 3,377,333 | 4/1968 | Ciesielski et al. | 260/97.7 |
| 3,417,071 | 12/1968 | Wheelus | 260/108 |
| 3,780,012 | 12/1973 | Smith | 260/97.5 |
| 3,780,013 | 12/1973 | Smith | 260/104 |

*Primary Examiner*—H. S. Cockeram
*Attorney, Agent, or Firm*—Harry H. Kline

[57] ABSTRACT

There are provided oxygen stable rosin-primary polyhydric alcohol esters and a process for esterifying a rosin with a primary polyhydric alcohol in the presence of catalytic amounts of an arylsulfonic acid added either simultaneously or subsequent to the initial rosin-polyhydric alcohol reaction to complete esterification and to obtain a rosin ester having markedly improved oxidation stability and good color.

17 Claims, No Drawings

OXYGEN-STABLE ROSIN-PRIMARY POLYHYDRIC ALIPHATIC ALCOHOL ESTERS AND A METHOD FOR PREPARING THE SAME UTILIZING ARYLSULFONIC ACID CATALYSIS

This application is a continuation-in-part of our co-pending application, Ser. No. 890,450, filed on Mar. 27, 1978, and now abandoned.

The present invention relates to oxygen-stable rosin-esters and to a process for esterifying a rosin with a primary polyhydric alcohol employing an arylsulfonic acid catalyst. More particularly, it relates to a process for esterifying a polyhydric alcohol employing an arylsulfonic acid catalyst introduced either simultaneously or subsequent to the initial rosin-polyhydric alcohol reaction to effect substantially rapid completion of the overall reaction.

It is known that a rosin can be esterified with a polyhydric alcohol usually in the presence of basic esterification catalyst. Unfortunately, such esters, being oxygen unstable, are generally unsuitable as rubber tackifiers. In general, esters of darkened color are noted. To improve such esters, particularly with respect to color, adjuvants are incorporated during esterification as, for instance, in U.S. Pat. Nos. 3,780,012 and 3,780,013, both issued on Dec. 18, 1973. Further, unduly long reaction times are required to carry the esterification reaction to substantial completion. Accordingly, if a process could be provided to prepare an oxygen-stable rosin ester useful as a rubber tackifier and being of markedly good color and high softening point in the absence of adjuvants, such would serve to fulfill a long felt need in the art.

Unexpectedly, it has been found that a rosin-primary polyhydric alcohol reaction could be completed within a relatively shortened time period by employing an arylsulfonic acid, rather than a basic catalyst so as to obtain a rosin ester of improved oxygen stability, color and softening point. It has further been found that the over-all esterification reaction can be completed within about ten hours or less utilizing a particular acid catalyst, hereinbelow defined, thereby avoiding, if desired, the incorporation of adjuvants to improve color of resultant esterification product. Such use is quite surprising, since the use of a strong acid catalyst, such as sulfuric acid, when incorporated directly into a rosin at normal esterifying temperatures usually decarboxylates the rosin, thereby preventing any further esterification from occurring.

According to the process of the invention, a rosin is reacted with a primary polyhydric alcohol at a temperature ranging from about 180° C. to about 300° C. Illustrative of the primary polyhydric alcohols utilized in the process of the invention are: pentaerythritol, dipentaerythritol, tripentaerythritol, trimethylolethane, trimethylolpropane, and equivalents of the same. Usually, an equivalent amount of the latter alcohol is employed, although an equivalent excess of up to about 35% with respect to the rosin can be tolerated.

The arylsulfonic acid used herein as the catalyst is present in amounts ranging from about 0.02% to about 1.0%, based on the weight of the rosin. Illustrative of such arylsulfonic acids are benzenesulfonic acid, p-toluenesulfonic acid, naphthylenesulfonic acid, and the like. Employing such catalysts markedly accelerates the rate of esterification to obtain an oxygen-stable product having the desired acid number below about 20 and being of good color and and softening point.

It is a preferred practice of the invention to incorporate the catalyst subsequent to the initial rosin/primary polyhydric alcohol reaction, i.e., when the overall acid number has been reduced to between about 110 and about 35, and preferably between about 60 and 40, usually while maintaining the reaction temperature between 220° C. and 300° C. However, if desired, the acid catalyst can be added to said reaction initially while preferably maintaining the reaction temperature between about 180° C. and 220° C.

Advantageously, the esterification reaction can be accomplished in the presence of an inert atmosphere, such as a nitrogen purge. If desired, a bleaching agent as disclosed in U.S. Pat. Nos. 3,377,333, 3,417,071 and 3,433,389 can be employed initially to further enhance the color of resultant ester so-prepared.

In general, any rosin can be employed. Exemplary of such are gum, wood and tall oil rosin. The rosin color standards referred to herein are U.S.D.A. standards varying from X, the lightest, to D, the darkest color. The scale of colors is designated as X, WW, WG, N, M, K, I, H, G, F, E, and D.

The invention may be better understood by referring to the examples provided below which are to be taken as merely illustrative. Unless otherwise specified, the parts are by weight.

EXAMPLE 1

To a suitable reaction vessel containing 500 parts of tall oil rosin and 67.5 parts molten pentaerythritol and heated to 220° C. are added incrementally 0.25 part of p-toluenesulfonic acid over a 45 minute period. The temperature is next raised to between 270° C. and 275° C. and maintained for about ten hours. There is obtained a product having a 77° C. Ring and Ball softening point and an acid number equal to 13.

EXAMPLE 2

To a suitable reactor are introduced 500 parts of WW rosin which is then heated under nitrogen to 220° C. Thereafter, 67.5 parts of technical pentaerythritol (PE) are added. The temperature is next raised to between 270° C. and 275° C., and stirred for one hour, at which time the acid number is found to be equal to 103. A catalyst, namely, 0.25 part of p-touenesulfonic acid is then added to the reaction mixture. The reaction temperature is maintained for a total of 11 hours at 275° C. At the end of this period, esterification had been found to be substantially completed, producing a rosin/PE ester having an acid number equal to 13, an N color, and an 84° C. Ring and Ball softening point.

EXAMPLE 3

The process of Example 1 above is carried out substantially in the same manner except that the catalyst is not added initially. It is, however, added after the initial tall oil rosin-pentaerythritol mixture has reacted for four hours, at which point the acid number had decreased from an initial value of 169 to 47. Thereafter, p-toluenesulfonic acid catalyst is added to the reaction mixture. After a total of seven hours reaction time, the product had an acid number of 15, an N-color and a softening point of 86.5° C.

Similar results are attained by employing dipentaerythritol as the primary polyol reactant.

EXAMPLE 4

To a suitable reaction vessel equipped with condenser and stirrer are added 100 parts of gum rosin having an acid number of 160 and 15.4 parts of trimethylolethane and heated at 270° C. for three and one-half hours. At this point the acid number of the mixture is reduced to about 45. There is then added 0.3 part of benzenesulfonic acid and the reaction is continued for an additional five hours at which point the acid number is reduced to 11 and a softening point of an N-color ester of 74.5° C. is attained.

Substituting disproportionated rosin for gum rosin in the above example, similar results are attained.

EXAMPLE 5

There are admixed as in Example 2 above, 100 parts of wood rosin (having a WW color) and 17 parts of trimethylolpropane. The mixture is heated at 270° C.–275° C. for 3 hours. There is noted a drop of acid number from 165 to 55. At this point, 0.2 part of naphthalenesulfonic acid is added to the reaction mixture and the latter heated for a total of nine and one-half hours.

Resultant ester is analyzed and found to possess an acid number of 11.9, an N-color, and a Ring and Ball softening point of 74.5° C.

EXAMPLE 6

This example illustrates the use of comparative, prior art basic catalysis.

To a suitable reactor is added 250 parts of tall oil rosin, 33.7 parts of technical grade pentaerythritol, and 0.125 part of calcium oxide. This mixture is heated under nitrogen and with stirring, to 270° C.–275° C. This temperature is maintained for fifteen hours at which point the acid number is found to be 15 and the product color is F-G.

EXAMPLE 7

This example illustrates the comparative use of representative rosin esters which are prepared by either acid or basic catalysis.

The esters prepared by the process of Example 3 (acid catalysis) and Example 6 (basic catalysis) are evaluated as tackifiers for pressure sensitive adhesives containing the following composition in a 90 parts per hundred rubber blend:

325 parts of SBR rubber (Synpol 1011A)
292 parts of powdered Rosin-Ester of Example 3 or 6 and exposed to air for two weeks at room temperature.
1.5 parts of dilaurylthiodipropionate
1.5 parts of 2,2'-methylene-bis(4-methyl-6-t-butylphenol)
1017 parts of toluene.

The hereinabove defined formulation is utilized to prepare pressure-sensitive tapes according to conventional procedures. The tapes are then evaluated according to standard testing procedures of the Pressure-Sensitive Tape Council (PSTC) for quick stick which is a measure of a tape's ability to adhere to a surface with minimum pressure. It is found that the tape containing the acid-catalyzed rosin ester of Example 3 gave a quick stick of 33 ounces per inch, while the corresponding tape containing the base-catalyzed rosin ester of Example 6 gave a quick stick of 0 oz./inch, indicating the marked superiority of the oxygen stable rosin ester of Example 3.

We claim:

1. A process for effecting rosin esterification which comprises the steps of: reacting at a temperature ranging from about 180° to about 300° C. a rosin with a solid primary polyhydric alcohol selected from the group consisting of pentaerythritol, dipentaerythritol, tripentaerythritol, trimethylolethane and trimethylolpropane in an equivalent amount but not more than a 35% excess based on the equivalent weight of said rosin, incorporating an arylsulfonic acid in catalytic amounts ranging from about 0.02% to about 1%, based on the weight of said rosin either initially or subsequent to said rosin-primary polyhydric alcohol reaction and, thereafter, recovering an oxygen stable rosin-primary polyhydric alcohol ester of at least N color and a softening point of at least 77° C., said ester having an acid number below about 20.

2. In a process for effecting the esterification of a rosin with a primary polyhydric alcohol according to claim 1 at temperatures ranging from about 220° C. to about 300° C., the improvement which comprises: initially reacting a rosin with at least an equivalent amount of a primary polyhydric alcohol for a time sufficient to reduce the acid number to between about 35 and about 110, thereafter incorporating an arylsulfonic acid in catalytic amounts, and recovering a rosin ester of good color and softening point and having an acid number below about 20.

3. The process according to claim 2 wherein the acid number is reduced to between 40 and 50 prior to catalyst addition.

4. The process according to claim 2 wherein the rosin is tall oil rosin.

5. The process according to claim 2 wherein the rosin is gum rosin.

6. The process according to claim 2 wherein the rosin is wood rosin.

7. The process according to claim 2 wherein the rosin is disproportionated rosin.

8. The process according to claim 2 wherein the primary polyhydric alcohol is pentaerythritol.

9. The process according to claim 2 wherein the primary polyhydric alcohol is dipentaerythritol.

10. The process according to claim 2 wherein the primary polyhydric alcohol is tripentaerythritol.

11. The process according to claim 2 wherein the primary polyhydric alcohol is trimethylolethane.

12. The process according to claim 2 wherein the primary polyhydric alcohol is trimethylolpropane.

13. The process according to claim 2 wherein the arylsulfonic acid is p-toluenesulfonic acid.

14. The process according to claim 2 wherein the arylsulfonic acid is benzenesulfonic acid.

15. The process according to claim 2 wherein the arylsulfonic acid is naphthalenesulfonic acid.

16. An oxygen stable reaction product of a rosin and a solid primary polyhydric alcohol, said alcohol being selected from the group consisting of pentaerythritol, dipentaerythritol, tripentaerythritol, trimethylolethane and trimethylolpropane, said reaction product being prepared according to the process of claim 1.

17. The oxygen stable rosin-pentaerythritol ester according to claim 16.

* * * * *